Patented Jan. 7, 1930

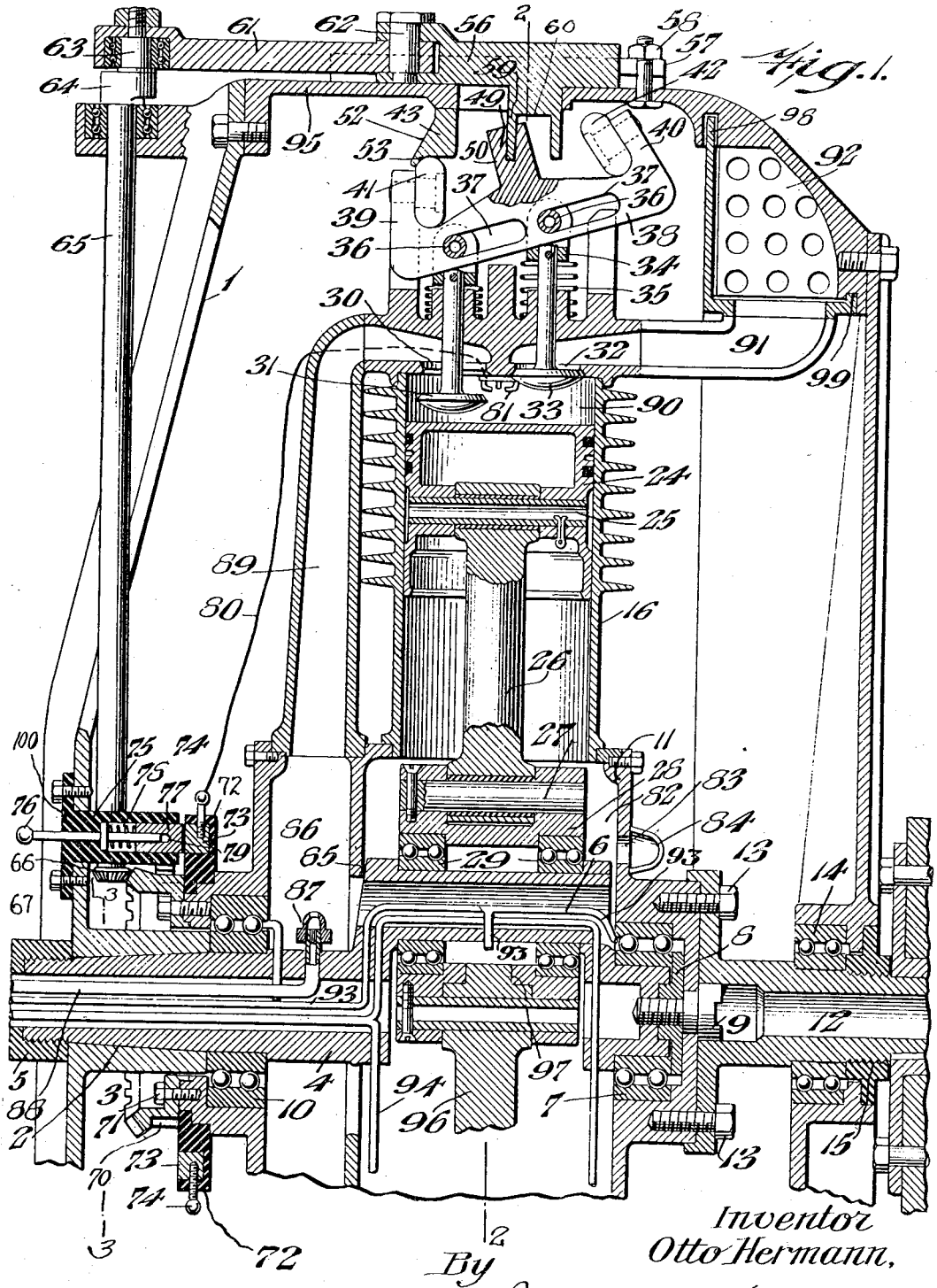

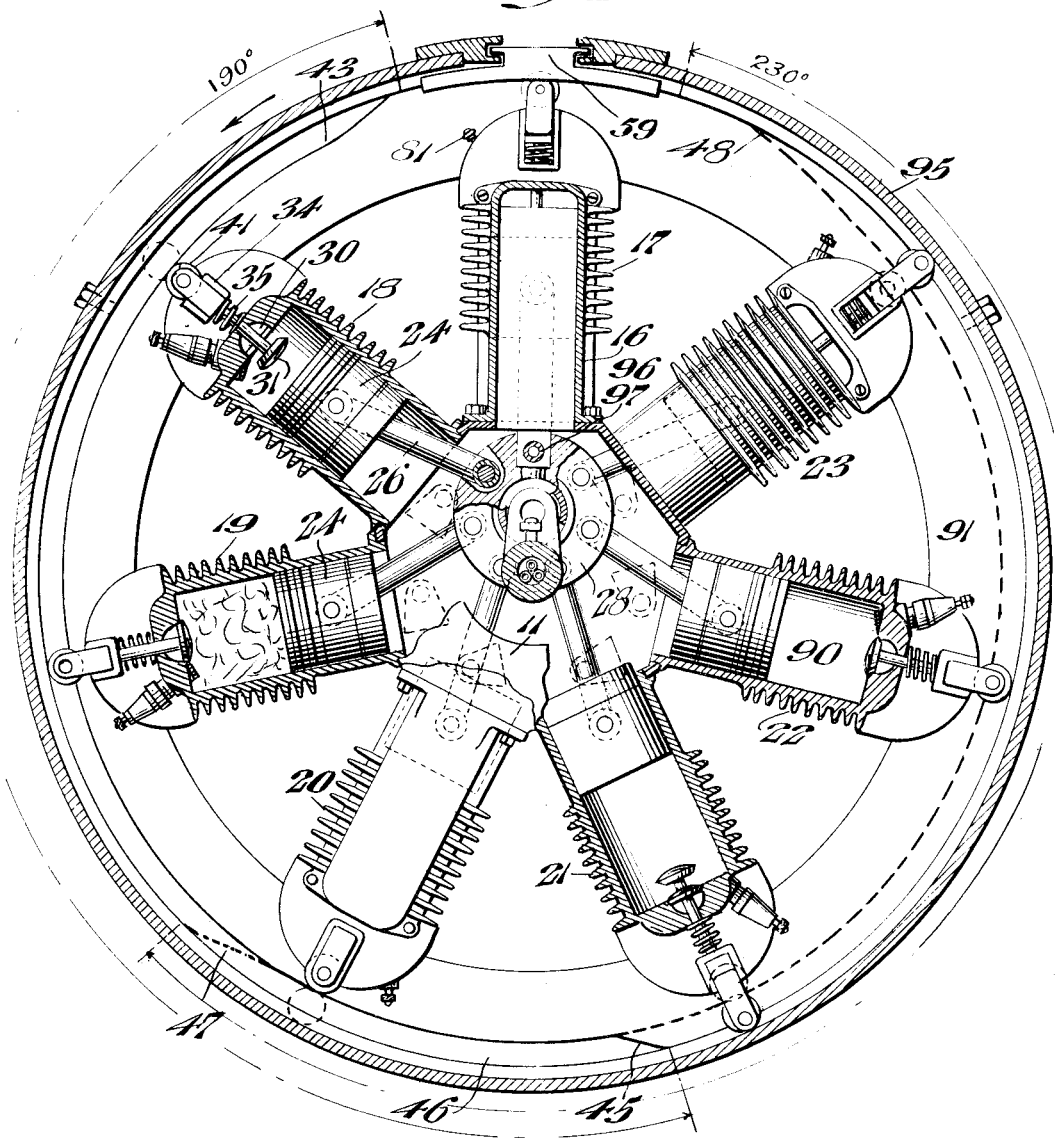

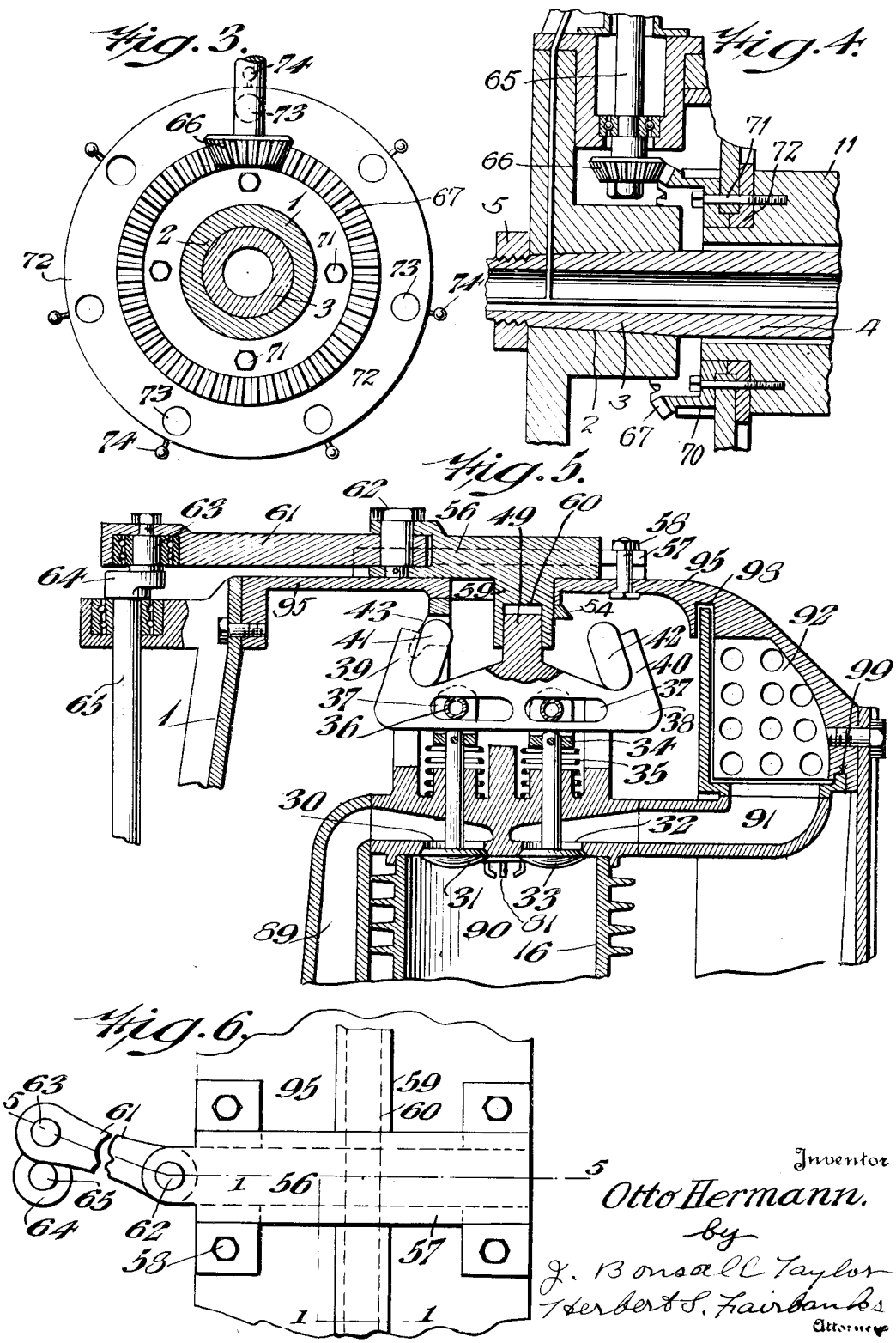

1,742,706

UNITED STATES PATENT OFFICE

OTTO HERMANN, OF PHILADELPHIA, PENNSYLVANIA, ASSIGNOR TO CENTURY ROTARY MOTOR CORPORATION, OF WILMINGTON, DELAWARE, A CORPORATION

INTERNAL-COMBUSTION ROTARY ENGINE AND METHOD OF OPERATING IT

Application filed July 6, 1925. Serial No. 41,596.

My invention comprehends a novel rotary internal combustion engine having multiple cylinders arranged to revolve around a fixed crank shaft, and provided with novel means to control and actuate the inlet and exhaust valves.

It further comprehends novel means for forming the explosive charge, and novel means for timing the duration of each part of the cycle.

It further comprehends novel means for effecting a circulation of atmospheric air to cool the cylinders, and novel means for utilizing the air thus heated in the formation of the explosive charges.

It further comprehends a novel method of operating an internal combustion rotary engine wherein the inlet valve is held open for a period equal to or greater than the duration of the suction stroke, and wherein the exhaust valve is retained open for a period equal to or greater than the exhaust stroke period. This enables one to fully charge and to completely scavenge the engine cylinders.

It further comprehends novel valve controlled means which is controlled by the engine to cause the rotary engine to operate on the four cycle principle.

Other features of construction and advantage will hereinafter more clearly appear in the detailed description and the appended claims.

For the purpose of illustrating the invention, I have shown in the accompanying drawing a typical embodiment of it, which, in practice, will give reliable and satisfactory results. It is, however, to be understood that this embodiment is typical only and that the various instrumentalities of which my invention consists can be variously arranged or organized, and that the invention is not, therefore, limited to the precise arrangement and organization of these instrumentalities as herein set forth.

Figure 1 is a sectional elevation showing a portion of an internal combustion rotary engine, embodying my invention, and by the use of which my novel method can be carried out, the section being taken substantially on line 1—1 of Figure 6, and also on line 1—1 of Figure 2. The section is taken substantially on line 1—1 of Fig. 6.

Figure 2 is a sectional elevation, the section being taken at substantially right angles to that of Figure 1 and substantially on line 2—2 of Figure 1.

Figure 3 is a section on line 3—3 of Figure 1.

Figure 4 is a section on line 4—4 of Figure 3, showing a portion of the gearing seen in Figure 3.

Figure 5 is a vertical section of a portion of the engine, the section being taken substantially on line 5—5 of Figure 6, a portion of this line of 5—5 corresponding to a portion of the section line 1—1.

Figure 6 is a top plan view of a portion of Figure 5.

Similar numerals of reference indicate corresponding parts.

Referring to the drawings:—

1 designates a skeleton frame or cage having a tapered bearing 2 to receive the tapered end 3 of a tubular stationary crank shaft 4 which is retained in position by means of a nut 5. The crank arm 6 is recessed to receive an anti-friction bearing 7, which is retained in place by means of a plate 8, extending into a recess in the crank arm 6, and fixed with respect to said crank arm by means of a bolt 9. The opposite end of the crank shaft carries an anti-friction bearing 10. An engine casing 11 is rotatably mounted on the anti-friction bearings 7 and 10, and the bolt 9 has a flange to engage the casing.

The engine shaft 12 has its inner end flanged and connected with the engine casing 11 by means of bolts 13. The engine shaft 12 has an annular recess to receive an anti-friction bearing 14, seated in the housing 1, and retained in place by a nut 15. 16 designates the engine cylinders which are secured to the engine casing 11 in any desired manner.

Any desired number of engine cylinders may be employed and for purpose of illustration I have shown seven cylinders as being employed. For convenience of description of the operation, the cylinders are given the reference characters 17, 18, 19, 20, 21, 22 and 23. Each piston 24 has fixed to it a bushing 25 to which the outer end of its connecting rod 26 is pivotally connected. The inner end of each connecting rod except a master connecting rod 96 is pivotally connected at 27 to a carrier in the form of a ring or collar 28 mounted on ball bearings 29 carried by the crank arm 8. The master connecting rod 96 is rigidly connected at 97 to the ring 28.

Each engine cylinder has an inlet port 30 controlled by an inlet valve 31, and is provided with an exhaust port 32 controlled by an exhaust valve 33. Each valve has its stem guided in its respective cylinder head and each stem carries a head 34 between which and the cylinder head is interposed a spring 35. Each valve stem head 34 carries a roller 36 which extends into its respective slot 37 of a tiltable or rockable valve controlling member 38 which at times has also imparted to it a sliding movement. This member 38 has upwardly converging ends 39 and 40. The end 39 carries a roller 41 and the end 40 carries a roller 42. The roller 41 co-operates with the intake cam track 43 fixed on the frame, having its intake end at 44 and terminating at 45, see Figure 2, so that it has a circumferential length of approximately 190°.

The roller 42 co-operates with the exhaust cam track 46 beginning at 47, see Figure 2, and terminating at 48 so that it has a circumferential length of approximately 230°.

The rocking member 38 has an upwardly extending and centrally disposed lug 49. Between 48 and 44 the cam tracks have a dwell or neutral portion which permits the inlet and the exhaust valves of a cylinder to be simultaneously closed. The cam track 43 has its outer side face inclined as at 52 to form a stop, and its inner face at one side curves inwardly as at 53. In a similar manner the cam track 42 has its outer side face inclined as at 54 to form a stop, and its inner face at one side curves inwardly in the same manner as the curvature 53.

The valve controlling member 38 is controlled by a slide 56, which is guided in the guide member 57 secured to the top of the housing 1 by means of fastening devices 58, see Figures 5 and 6. The slide 56 is provided with a cross head 59 having a slot 60 into which the lug 49 of a valve controlling member 38 is adapted to pass during the revolution of the cylinders.

A link 61 is pivotally connected at 62 to the slide 56, and, at its opposite end, it is eccentrically connected, as at 63, with the head 64 of a shaft 65 which is journalled in the frame 1. The lower end of this shaft 65 carries a gear 66 which meshes with a gear 67 fixed to a gear 70.

The hub of the engine casing 11 has fixed to it by means of fastening devices 71 a ring 72 of insulating material, see Figure 1, which carries contacts 73 of conducting material, with which are connected the binding posts 74.

The housing 1 has secured to it a block of insulating material 100 which carries a binding post 76 which is connected with a source of electric supply, such as the battery or the magneto of the engine. The block of insulating material 74 has mounted in it a contact plunger 77, of conducting material, between which and a shoulder on the binding post 76, is interposed a spring 78, so that the plunger 77 is retained in the path of the revolving contacts 73. The inner end of the binding post 76 is slidable in a recess 79 in the plunger 77. Each binding post 74 is connected by means of a conductor 80 with the spark plug 81 of its respective engine cylinder 16. The timing is such that alternate engine cylinders are fired. The engine casing 11 is provided with a chamber 82 having a series of constantly open and uncontrolled air inlet ports 83, there being an air inlet port for each engine cylinder.

The engine casing 11 is provided with a scoop or air deflector 84 for each air inlet port 83 to deflect the air thereinto. The air passes from the chamber 82, in which it cools the cylinders and is heated, through the port formed by the clearance 85 into the commingling chamber 86 into which the fuel is atomized from the fuel nozzle or atomizer 87, which latter communicates by means of a conduit 88 with a source of fuel supply, which is fed under pressure to the fuel nozzle or atomizer 87. The explosive charge thus formed passes through the passage 89 to its respective fuel inlet port 30, which communicated with its respective piston chamber 90. Each piston chamber 90 communicates by means of its respective exhaust passage 91 with a muffler 92 of any desired or conventional type.

As shown, this muffler consists of a series of annular perforated plates so that no flame can pass from the main exhaust to the atmosphere, and there is no possibility of the aeroplane, automobile, boat or other type of motor vehicle with which the engine is employed being set on fire.

In my present invention the lubrication is effected by a centrifugal action. It will be seen from Figure 1 that a conduit 93 leading from a source of supply of lubricating material conducts the lubricating material to the anti-friction devices 29, 7 and 10, and a conduit 94 for the lubricating material has branches which discharge into each engine cylinder 16 so that an effective lubrication of all of the moving parts is provided.

The housing 1 is in the form of a skeleton or cage like frame having its sides connected at their outer ends with the ring 95 which carries the stationary valve controlling cam consisting of the cam track 43 and 46, each of which is in the form of a partial ring. The ring 95 reduces in diameter towards one end, surrounds the engine and its radially disposed cylinders, and forms a stream line cowling.

The walls of the exhaust passage 91 travel in annular grooves 98 and 99 in the ring 95 to form an air tight connection. The main exhaust, not shown, from the muffler is near the driven shaft 12. In Fig. 1, I have shown the rockable and slidable cam controlled member in a position to retain the inlet valve in its open position while in Fig. 5 this member is shown in its neutral position, at which time it does not actuate an inlet or an exhaust valve and it is in the position in which the sliding action takes place to select the valve which is to be actuated. This is caused by the engine driven slide 61. This slide is provided with a slot or channel 60 which extends for a desired distance around the periphery so that the lug 49 of the valve controlling member 53 is in engagement with this slot for a distance of 57°. The section line on which Fig. 1 is taken is substantially on line 1—1 of Fig. 6, and the lug is shown as having passed beyond the channel and rocked into the position seen in Fig. 1. The electric current for the ignition system is brought in through the stationary frame and the rotary distributor conducts the current to the spark plugs of the engine cylinders so that they are fired in a predetermined order and as herein shown they are fired alternately during their revolution.

The operation of my novel internal combustion rotary engine and the method of operating it will now be apparent to those skilled in this art and is as follows:—

I employ an odd number of engine cylinders, and, for the purpose of illustration, I have shown seven engine cylinders which are alternately fired. With each engine cylinder the intake, compression, and firing is accomplished in one revolution, and the power stroke and the exhaust is accomplished in a second revolution of the engine.

In the position of the parts shown in Figure 2, the engine cylinder 17 has fired; the engine cylinder 18 is on its intake stroke; the engine cylinder 19 is on its power stroke; the engine cylinder 20 is on its intake stroke; the engine cylinder 21 is on its exhaust stroke; the engine cylinder 22 is on its compression stroke; and the engine cylinder 23 is on its intake stroke.

Assuming, now that the parts are in their operative position, the fuel under a desired pressure continuously passes through the fuel conduit 88, and discharges from the fuel nozzle or atomizer 87 into the commingling chamber 86 into which the heated air is forced under a pressure greater than atmospheric pressure on the suction stroke of each engine cylinder.

This air passes into the heating chamber 82 of the engine casing 11, such action being facilitated by the scoops 84 which revolve in unison with the engine cylinders 16.

The heated air passes through the port formed by the clearance 85 into the commingling chamber 86, forming the sole supply of air for combustion and commingles therein with the fuel and forms an explosive charge which passes through the passage 89 and through the inlet port 30 of an engine cylinder 16 into a piston chamber.

The times at which the inlet and exhaust valves open and close may vary widely in practice, but, as illustrated, the inlet valve is opened and retained in open position during the entire suction stroke and for approximately 190°. The exhaust valve is opened and remains open for the entire exhaust stroke and for approximately 230°. The compression stroke is approximately 130°. The firing takes place about 20° before dead centre.

The inlet valve remains in open position preferably for a period greater than the entire suction stroke, and the exhaust valve remains open for a period greater than the duration of the exhaust stroke. The intake valve, as shown in Figure 2, begins to open at 44 and closes at 45, while the exhaust valve begins to operate at 47 and closes at 48. Between these two points 48 and 44 the firing takes place.

As illustrated, the engine revolves in the direction of the arrow seen in Figure 2.

In carrying out my novel method of control, the valves are controlled in such a manner that the revolving cylinders operate on the four cycle principle. During the first revolution the intake compression and firing take place, and on the next revolution the power stroke and the exhaust take place.

My present application discloses the subject matter with certain additional features of my prior application filed June 22, 1918, and allowed December 17, 1918, Serial No. 241,341 and my prior application filed September 15, 1918, Serial No. 323,704, and allowed October 20, 1920.

Special attention is directed to the novel manner in which atmospheric air is continuously admitted into the engine cylinders to cool them, and the utilization of such heated air to form with the fuel the explosive charges.

Special attention is also directed to the novel valve controlling means employed, governed by a fixed cam, and positioned by means actuated by the engine to cause the valve controlling means to be operated by one cam track or the other.

It will now be apparent that I have devised a new and useful internal combustion rotary engine and method of operating it, which embodies the features of advantage enumerated as desirable in the statement of the invention and the above description, and that while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention, what I claim as new and desire to secure by Letters Patent, is:—

1. In an internal combustion rotary engine, engine cylinders, valves therefor, a member at the outer end of each cylinder movable to alternately select an inlet or an exhaust valve and rockable to actuate the selected valve, engine driven means to position said member to effect the selection of the valve to be operated, and means to rock said member to actuate the selected valves.

2. In an internal combustion rotary engine, engine cylinders, valves therefor, a member at the outer end of each cylinder movable to alternately select an inlet or an exhaust valve and rockable to actuate the selected valve and resiliently supported, engine driven means to position said member on its support to select a valve for operation, and means to rock said member to actuate the selected valves.

3. In an internal combustion rotary engine, engine cylinders, inlet and exhaust valves therefor, and valve controlling means comprising a stationary cam surrounding said cylinders, and means at the outer end of each cylinder movable to select a valve and rockable by said cam to actuate the selected valve, said cam having a neutral portion to permit the inlet and exhaust valves to simultaneously close.

4. In an internal combustion rotary engine, engine cylinders, valves therefor, and valve controlling means comprising a stationary cam, and a member at the outer end of each cylinder slidable to different positions to select a valve and rockable to actuate the selected valve and controlled by said cam to actuate said valves, and means to position said member for the proper opening and closing of said valves.

5. In an internal combustion rotary engine, engine cylinders, a crank about which said cylinders revolve, inlet and exhaust valves, springs for said valves, a stationary cam, a valve controlling member at the outer end of each cylinder retained in operative relation with said cam by said springs, and means to move said member into and retain it in different positions to select a valve.

6. In an internal combustion rotary engine, a fixed crank, a plurality of cylinders arranged for rotation about said crank, connecting rods attached to said crank, pistons for the cylinders connected to said rods, inlet and exhaust valves, means for controlling said valves comprising a stationary cam ring surrounding said cylinders, members rocked by said cam ring and mounted for movement to select an inlet or an exhaust valve, and engine driven means to move said members to cause them to alternately cooperate with an inlet and an exhaust valve.

7. In an internal combustion rotary engine, a fixed crank, a plurality of radially arranged cylinders mounted for rotation about said crank, inlet and exhaust valves, a stationary cam ring, a member at the outer end of each cylinder mounted for bodily movement to position it for either an inlet or an exhaust valve and for rocking movement for operating said valves and provided with a lug, and engine driven means engaging said lug to position said members to actuate said valves in a predetermined order.

8. In an internal combustion engine, a stationary frame having spaced circumferentially disposed cams, engine cylinders mounted to revolve within the frame, valves for said cylinders, a member rockable by one or the other of said cams to actuate said valves, and engine driven means to position said member to cause it to be selectively controlled by one or the other of said cams.

9. In an internal combustion rotary engine, a stationary frame having spaced, circumferentially disposed cams, engine cylinders rotatably mounted within said frame, inlet and exhaust valves for said cylinders, a member for each cylinder movably mounted to cooperate with an inlet or an exhaust valve, and rockable to actuate a selected valve, said cams having a cam face to effect the rocking of a valve and having a cam face to retain the member in position to actuate a selected valve, and means to selectively position said members for the operation of the valves in a predetermined order.

10. In an internal combustion rotary engine, a stationary crank, a plurality of cylinders arranged with respect thereto and having valve controlled inlet and exhaust ports, a casing surrounding said cylinders and provided with cam tracks, each of said cylinders having a member movable to different positions to select a valve and rockable to actuate the selected valve and engaging one or the other of said tracks for causing the opening and closing of the inlet and exhaust valves in a predetermined order.

11. In an internal combustion rotary engine, a fixed crank having an offset portion, an odd number of cylinders rotatably supported about said offset portion, a crank case mounted on the main part of said crank and to which said cylinders are secured, a fixed framework surrounding said cylinders, an engine controlled element mounted in said framework, inlet and exhaust valves, and means controlled by said element to effect the operation of said inlet and said exhaust valves and including a member slidable to select an inlet or an exhaust valve and rockable to actuate the selected valve.

12. In an internal combustion rotary engine, a stationary crank, a crank case rotatably supported on the crank and to which the cylinders are attached, said engine having an odd number of cylinders, means for alternately firing said cylinders, and controlling means for said inlet and exhaust valves comprising a member for each cylinder bodily slidable into different positions to select a valve and rockable to actuate the selected valve, and engine controlled means for positioning said member.

13. In an internal combustion rotary engine, a frame provided with a cam having spaced tracks in the form of partial rings, engine cylinders rotatably mounted within said frame, an inlet and an exhaust valve for each cylinder, means carried by each cylinder cooperating with one of said tracks to control the inlet valves and with the other of said tracks to control the exhaust valves, and means carried by the frame to adjust said valve controlling means at predetermined times during each of its revolutions to cause it to be operative to engage one of said cam tracks and to be inoperative to engage the other of said cam tracks.

14. In an internal combustion rotary engine, a stationary crank, an odd number of cylinders mounted thereon, and a casing connected with the cylinders and having scoops to force atmospheric air through uncontrolled openings into the cylinders to cool them during their revolution, and means to utilize the air heated by the cooling of the cylinders to form the explosive charges.

15. In an internal combustion rotary engine, a stationary crank, a crank case mounted thereon, an odd number of cylinders connected with said crank case, said crank case being in free communication with said cylinders and their pistons, and air scoops revoluble with said crank case to force atmospheric air into it through uncontrolled openings in the crank case to cool it and to also cool the inner walls of said cylinders and their pistons and means to utilize such air to form the explosive charges.

16. The method of operating an internal combustion rotary engine, which consists in raising the pressure of air above atmospheric pressure by the revolution of the engine, and by such revolution forcing it under pressure through uncontrolled openings into the engine cylinders to preheat the air, withdrawing the preheated air from said cylinders and continuously forcing the preheated air into a confined chamber, and continuously feeding fuel under pressure in a vaporized condition into said chamber to commingle with the preheated air to form an explosive charge.

17. The method of operating a high speed internal combustion rotary engine, which consists in raising the pressure of atmospheric air above its atmospheric pressure by the revolution of the engine and by such revolution forcing it under pressure through uncontrolled openings into the engine cylinders to preheat the air, withdrawing the preheated air from the cylinders and the inner ends of the piston and continuously forcing the preheated air into a confined chamber, continuously feeding fuel under pressure into said chamber to commingle with the preheated air to form an explosive charge, and introducing an explosive charge into an engine cylinder during the entire suction stroke of its piston.

18. The method of operating a high speed internal combustion engine, which consists in raising the pressure of air above its atmospheric pressure by the revolution of the engine and by such revolution forcing it under pressure into the engine cylinders to preheat the air, withdrawing the preheated air from the cylinders and the inner ends of the piston and continuously forcing the preheated air into a confined chamber, continuously feeding fuel into said chamber to commingle with the heated air to form an explosive charge, introducing an explosive charge into an engine cylinder during the entire suction stroke of its piston, and exhausting from an engine cylinder for a period greater than the exhaust stroke of its piston.

19. The method of operating a high speed internal combustion rotary engine, which consists in raising the pressure of atmospheric air above its atmospheric pressure by the revolution of the engine and by such revolution forcing it under pressure into the engine cylinders to preheat the air, withdrawing the preheated air from the cylinders and the inner ends of the piston and continuously feeding the preheated air into a confined chamber, continuously feeding fuel into said chamber to commingle with the air to form an explosive charge, introducing an explosive charge into an engine cylinder, and exhausting from an engine cylinder for a period greater than the exhaust stroke of its piston.

20. The method of operating a high speed internal combustion engine having its cylinders mounted to revolve in the same plane, which consists in introducing an explosive charge into each cylinder and controlling such introduction by a stationary cam to hold the intake open during the revolution of its cylinder for a period greater than the duration of the intake stroke of its piston, and alternately firing said cylinders.

21. The method of operating a high speed internal combustion rotary engine having its cylinders mounted to revolve in the same plane, which consists in introducing explosive charges into the cylinders, alternately firing the cylinders, and exhausting from an engine cylinder and controlling such exhaust by a stationary cam to hold the exhaust open for a period greater than the duration of the exhaust stroke of its piston.

22. The method of operating an internal combustion rotary engine, which consists in continuously forcing atmospheric air under a pressure created by the revolution of the engine and greater than its atmospheric pressure into the crank case and cylinders and therefrom continuously into a commingling chamber to form the sole source of air supply, continuously feeding fuel into said chamber to commingle with the air to form an explosive charge, introducing the explosive charges into the cylinders, and firing the cylinders.

23. In an internal combustion engine, a stationary casing, engine cylinders within the casing, valves for said cylinders, and valve controlling means comprising two stationary cams fixed to the casing, and a member at the outer end of each cylinder, controlled by said cams, movable to select a valve and rockable to actuate the selected valve.

OTTO HERMANN.